Nov. 7, 1944.         H. L. REED         2,362,216
METHOD OF RECOVERING MINERALS
Filed June 24, 1940
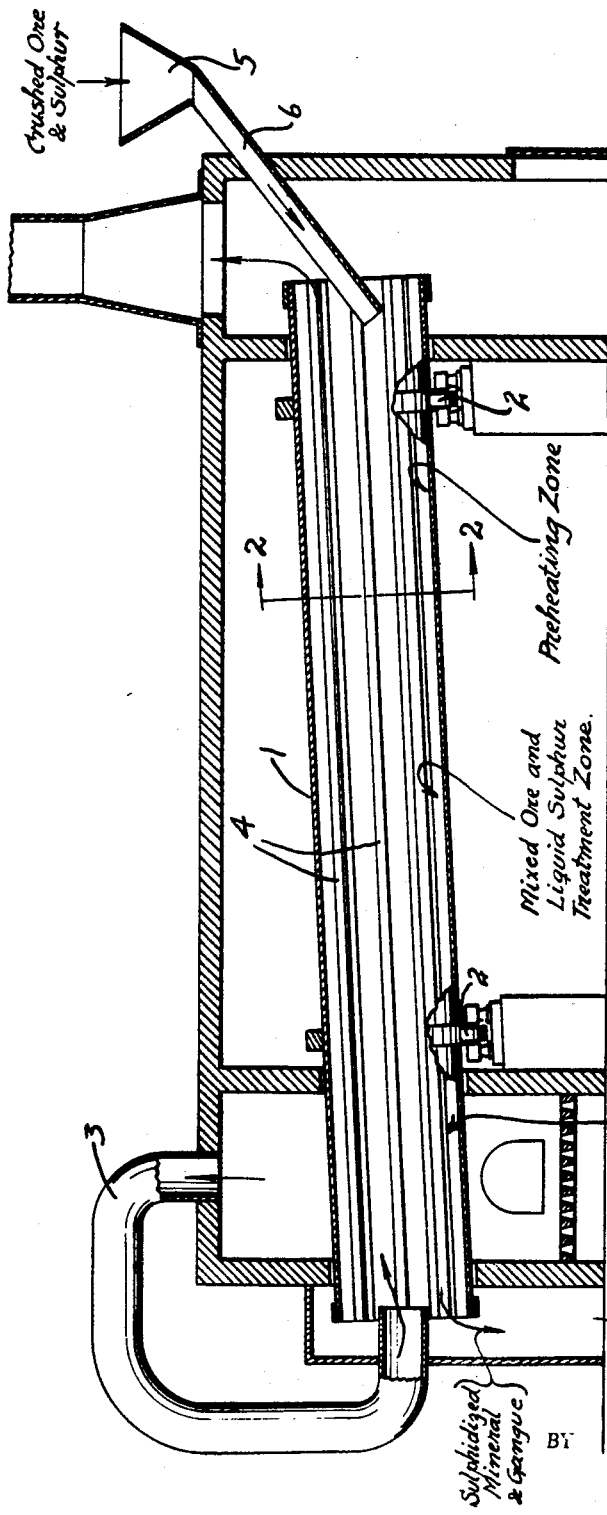
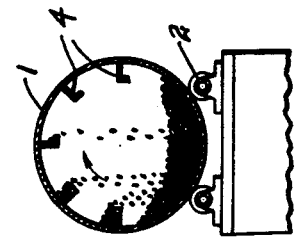
H. L. Reed.
INVENTOR.

Patented Nov. 7, 1944

2,362,216

UNITED STATES PATENT OFFICE 2,362,216

METHOD OF RECOVERING MINERALS

Howard L. Reed, San Antonio, Tex.

Application June 24, 1940, Serial No. 342,127

3 Claims. (Cl. 75—1)

This invention relates to the recovery of minerals from their ores, and more particularly crude ores containing metals combined in various ways with oxygen.

An object of the invention is to provide an improved method of converting the oxide minerals of the ore into sulphide minerals, and then recovering such sulphide minerals.

Another object is to devise an improved method of sulphidizing and dissolving the minerals of the ore by means of liquid, molten sulphur.

A still further and more specific object of the invention is to devise an improved method of treating crushed ore with sulphur at high temperatures, in such manner that the sulphur vapor generated is condensed upon the surface of the ore.

And still another specific object is to devise a method of treating oxide minerals with sulphur, wherein the sulphur dioxide generated is reduced to sulphur and used again.

Other objects and advantages of the invention will appear from the following specification.

The mineral deposits occurring in nature may be roughly classified as:

1. Native metals such as gold, tin, copper, silver, mercury, etc.
2. Oxide minerals, including carbonates, sulphates, etc., such as antimony pentoxide, copper oxide or carbonate, oxides and carbonates of zinc or lead, oxide of tin, etc. Whenever in this specification and the appended claims reference is made to the "oxides" of a given mineral, it is intended to include such carbonates, sulphates, etc., of such minerals.
3. Sulphide minerals such as antimony sulphide, copper sulphide, zinc sulphide, etc.

Commercially feasible methods of recovering metals from many of the oxide ores are well known, and have been extensively practiced, especially where the ores are relatively simple and of high grade. There are, however, many complex or low grade ores containing minerals of the oxide type, such, for example, as crude ores containing antimony pentoxide, which have proven unprofitable to work by any method heretofore known.

Many commercially feasible methods of recovering metals from the sulphide ores are also known and have been extensively employed, some of such methods comprising roasting the ores to convert the sulphides into oxides, and thereupon reducing the oxides or subliming and removing them by means of an air blast. Many low grade sulphide ores have been successfully concentrated by the well known flotation process, the ores, of course, being previously pulverized for this purpose.

It is known, however, that most ores containing minerals of the oxide group are not capable of concentration by means of the flotation method, and many attempts have been made to devise processes for converting crude oxide ores into sulphide ores in order to make it possible to concentrate them by the flotation process. Among the methods of sulphidation which have thus been tried is the treatment of the pulverized crude ores with aqueous solutions containing sulphur, such, for example, as sodium sulphide. These methods have achieved mediocre success in some cases, while in other instances, as, for example, in the case of crude ores containing antimony pentoxide, they have been entirely unsuccessful.

As stated in the preamble, one of the main objects of the present invention is to devise an improved and commercially feasible method of sulphidizing crude ores of the oxide type in order to render them capable of concentration by the flotation or other known processes.

I have discovered that such sulphidation of these oxide minerals can be effectively achieved by treating them with molten liquid sulphur.

The only necessary preliminary preparation of the ores consists in crushing them to the proper size. The average diameter of the crushed product in the case of readily sulphidized minerals, such as copper ores, may be as large as two inches, while in the case of other minerals, such as antimony, the most desirable size for the lump might be as small as one-eighth inch.

Sulphur melts at about 120° C. and at higher temperatures, especially above 300° C., it is a mobile liquid. It boils at about 445° C., producing an orange colored vapor.

Many methods of bringing the crushed ore into contact and treating it with liquid sulphur can be devised, the essential thing being, of course, that the ore must be heated to a point above the melting point of sulphur, and preferably considerably higher.

One convenient means by which the reaction may be carried out is shown, by way of example, in the accompanying drawing, forming part of this specification, and in which:

Fig. 1 is a view partly in side elevation and partly in longitudinal vertical section, illustrating a rotary kiln adapted for the carrying out of the method constituting the invention, and Fig. 2 is a transverse section through the kiln substantially on the line 2—2 of Fig. 1, looking in the direction of the arrows.

A rotary kiln or drier, such as shown in the drawing, is well known in the metallurgical art, and is described, for example, on page 1240 of "Chemical Engineer's Handbook" by J. H. Perry, (1934). It consists of a long inclined cylindrical shell 1, mounted to rotate on rollers 2 or the like, into the lower end of which shell heated flue gas is introduced by means of a flue 3, extending from a suitable furnace, which gas passes through the drier over the material. Shelves or flights 4 may be attached to the interior of the shell and extend lengthwise thereof parallel to the axis, projecting radially toward the center. The ore, mixed with sulphur, is continuously introduced into the upper end of the shell, as by means of a hopper 5 and chute 6 and as it revolves, the shelves serve to lift the material and drop it through the stream of hot gas. Thus, rapid heat transfer is effected.

As the hot flue gas passes from the lower end of the shell 1 towards its upper end, the flue gas will naturally become cooler, and thus the temperatures within the shell will vary from a maximum at the lower end where the flue gases are introduced to a minimum at the upper end where they leave the shell. A zone adjacent the lower end of the shell would thus be hotter by comparison than a zone adjacent the upper end of the shell and any zone intermediate the ends of the shell would be hotter than a zone at the upper end thereof and cooler than a zone at the lower end thereof.

As the mixed ore and sulphur travels downwardly through the drier, it moves into and through such zones of progressively increasing temperature, the temperature at some intermediate zone being sufficiently high to melt the sulphur and cause it to assume the liquid state. Thus, as the charge travels down the kiln, the ore is brought into intimate contact with the molten sulphur and any mineral oxides or oxygen compounds present are converted into sulphides.

The lower or hottest end of the kiln is preferably at a temperature sufficiently high to cause the sulphur to boil and pass off as vapor. Thus, the excess sulphur associated with the ore as it approaches the lower end of the drier is evaporated, thus leaving only the gangue and the mineral sulphides mixed therewith.

The sulphur vapor passes back up through the drier in a counter-current and as it encounters the relatively cool ore toward the upper end of the shell, is condensed thereon. Thus the excess sulphur is recovered and mixed with the incoming ore and used over again.

The oxygen contained in the oxide minerals being treated combines with a part of the sulphur to form sulphur dioxide, as for example:

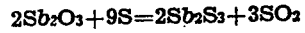

$$2Sb_2O_3 + 9S = 2Sb_2S_3 + 3SO_2$$

The hot flue gases from the furnace, which are caused to circulate through the kiln or drier, contain carbon monoxide. This reacts with and reduces the sulphur dioxide to sulphur, in accordance with the equation:

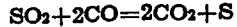

$$SO_2 + 2CO = 2CO_2 + S$$

This recovered sulphur also mixes with the ore as it travels along. Thus, the sulphur, in excess of that required to form the actual sulphides, is continuously recirculated in a cycle.

The metal, reduced from the oxides or other oxygen compounds, as above explained, combines with the sulphur to form the corresponding sulphide. The latter may, in many cases, dissolve in the liquid sulphur medium, from which it crystallizes when this solvent is vaporized, as above described. This crystallized material consists of particles of concentrated sulphides of substantially uniform composition throughout, as distinguished from any sulphides which remain in the ore, which latter usually consist of irregular impregnations which permeate the gangue material.

The sulphidized ore, dried of the liquid sulphur, may, in some cases, be concentrated in a smelter, wherein, an air blast reconverts the mineral into an oxide vapor and blows the latter through a bag house in which the sublimed mineral accumulates. An example of this is antimony sulphide, which is converted by the air blast into antimony trioxide vapor. The pure metallic sulphide particles which have been crystallized by the evaporation of the molten sulphur solvent are particularly adapted to this air blast oxidation method.

On the other hand, when the sulphidized mineral, such as antimony sulphide, approaches the lower or hotter end of the kiln, the temperature may be raised to such a point that sublimation takes place, and the sublimate, mingled with the hot flue gases, may be transported thereby to a bag house where the sublimed material is recovered.

As is well known, thermal decomposition of many chemical compounds takes place upon the attainment of a certain optimum temperature, provided other more active chemical elements are not present. This is true in the case of certain sulphidized minerals, which may thus be readily reduced to the corresponding metal by thermal decomposition. Manganese sulphide, for example, will decompose at about the boiling point of sulphur, thus producing metallic manganese, which may be recovered in any well known manner. Similarly, mercury polysulphide is decomposed into mercury vapor and sulphur vapor, separable by condensation.

In still other cases, where the material is not adapted for treatment by any of the above methods, the mineral content can frequently be successfully concentrated by the flotation process.

For this purpose, the sulphidized crude ore discharged from the rotary drier may be accumulated and allowed to cool in a hopper or rotary cooler, which is preferably enclosed and filled with cold flue gas or the like, in order to avoid oxidation of the hot minerals.

The crude sulphidized ore, when partially cooled, is then conveyed to a suitable mill, such as a rod or ball mill, and there finely ground or pulverized. The pulverized material may then be readily concentrated by the flotation process.

In some cases, preliminary flotation of the residual excess sulphur by means of a selective collector, such as pine oil, may precede the flotation of the sulphidized mineral, as otherwise both free sulphur and concentrated mineral sulphide may be simultaneously recovered. In this event, however, the excess sulphur can be readily vaporized from the concentrate and recondensed.

By thus converting oxide minerals into sulphides, and recovering them by means of the flotation process, it is possible to treat successfully very low grade ores and to recover almost the entire mineral content. Thus, in the case of metallic crude ores containing copper carbonate or copper oxide, I have found that the unrecoverable portion of copper remaining in the gangue is less than ten per cent (10%) of the total initial copper content and in the case of ores containing antimony pentoxide the unrecoverable portion of antimony is less than twenty per cent (20%) of the total initial antimony content.

Still other methods of recovering metals from or concentrating the sulphidized crude ores produced by the present invention may be employed. Thus, for example, if the sulphidized minerals are of a magnetic nature, as, for instance, iron compounds, they may be concentrated by means of a magnetic separator; or, if they possess the proper characteristics, may be concentrated by the electrostatic method. In either case, the material must, of course, be pulverized after sulphidation, and my improved method of sulphidizing is particularly advantageous in connection with either the magnetic or electrostatic methods, since it leaves the material in a bone dry condition.

I have found that the sulphidizing process above described may be accelerated by the presence of traces of certain catalysts. These may consist of any of the halogens or halogen compounds. Of these possible catalysts, iodine is perhaps commercially the most desirable. Iodine, for example, melts at 114° C., which is about the same as the melting point of sulphur, in which the iodine dissolves, and it vaporizes at 183° C., whereas sulphur boils at 445° C. Hence no iodine will remain in the crude ore after the latter has been leached by the liquid sulphur and dried by evaporation of the sulphur therefrom.

While I have described, by way of example, the sulphidizing of crude ores by causing a mixture of the ore with sulphur to travel through a kiln or heating chamber, the invention is by no means limited to such a method. The only essential requirement is that the ore be heated to a temperature above the melting point of sulphur, and that the heated ore be brought in contact with liquid sulphur. These requirements may be met, for example, by feeding the heated ore onto a moving screen or conveyor which might pass through a liquid sulphur bath, or onto which liquid sulphur might be sprayed. Many other methods of bringing the ore into contact with molten sulphur will, no doubt, readily suggest themselves to those skilled in the art.

While the foregoing discussion has been devoted primarily to the question of treating, with molten sulphur, non-sulphide minerals, there are some cases in which the treatment of even sulphide minerals with molten sulphur by my improved method may be advantageous. In many cases, the sulphides contained in such minerals are converted by the liquid sulphur into polysulphides and thus rendered more soluble in the molten sulphur. The liquid sulphur, therefore, after having converted the sulphides into polysulphides, leaches these polysulphides from the gangue material, and, upon evaporation of the sulphur, as above described, these polysulphides crystallize out in a concentrated form.

What I claim is:

1. In the recovery from their ores of oxide minerals capable of being sulphidized by contact with sulphur, the method which comprises causing a mixture of the crushed ores with sulphur to travel through zones increasing progressively in temperature up to a point above the melting point of sulphur, whereby the oxide minerals are brought into intimate contact with molten sulphur and the oxygen present in such minerals combines with part of the sulphur to form sulphur dioxide, and causing hot gases containing carbon monoxide to flow in a counter-current over said mixture of ore and sulphur, whereby the sulphur dioxide formed is reduced by the carbon monoxide, and the resulting free sulphur thus recovered is returned to the traveling mixture.

2. In the recovery from their ores of oxide minerals capable of being sulphidized by contact with sulphur, the method which comprises converting the oxide minerals into metallic sulphides, insoluble in aqueous solutions, by bringing the ores into intimate contact with molten elemental sulphur in the presence of a catalyst containing iodine, at a temperature between the melting and boiling points of sulphur, and in the absence of alkali compounds, maintaining such contact until the oxide minerals are substantially sulphidized, and recovering the resulting sulphides as such, in water-insoluble form.

3. In the recovery from their ores of oxide minerals capable of being sulphidized by contact with sulphur, the method which comprises converting the oxide minerals into metallic sulphides, insoluble in aqueous solutions, by bringing the ores into intimate contact with molten, elemental sulphur, at a temperature between the melting and boiling points of sulphur, and in the absence of alkali compounds, maintaining such contact until the oxide minerals are substantially sulphidized, and recovering the resulting sulphides as such, in water-insoluble form, in which method a mixture of the crushed ores with sulphur is caused to travel through zones increasing progressively in temperature up to a point above the boiling point of sulphur, whereby the crushed ores are first brought into intimate contact with molten sulphur and thus substantially sulphidized, and then the liquid sulphur adhering to the solid sulphidized material is evaporated, and whereby the resulting sulphur vapor is condensed upon that portion of the charge passing through a lower temperature zone.

HOWARD L. REED.